United States Patent [19]

Udagawa

[11] Patent Number: 5,076,595
[45] Date of Patent: * Dec. 31, 1991

[54] STEEL LAMINATE GASKET

[75] Inventor: Tsunekazu Udagawa, Ichikawa, Japan

[73] Assignee: Ishikawa Gasket Co., Ltd., Tokyo, Japan

[*] Notice: The portion of the term of this patent subsequent to Feb. 6, 2007 has been disclaimed.

[21] Appl. No.: 439,664

[22] Filed: Nov. 20, 1989

Related U.S. Application Data

[63] Continuation-in-part of Ser. No. 231,303, Aug. 11, 1988, Pat. No. 4,898,396.

[51] Int. Cl.⁵ .............................................. F16J 15/10
[52] U.S. Cl. .................................... 277/232; 277/234; 277/235 A; 277/235 B
[58] Field of Search ................... 277/235 B, 236, 234, 277/232, 235 A

[56] References Cited

U.S. PATENT DOCUMENTS

| | | | |
|---|---|---|---|
| 4,728,110 | 3/1988 | Nakasone | 277/235 B X |
| 4,739,999 | 4/1988 | Ishii et al. | 277/235 B |
| 4,759,585 | 7/1988 | Udagawa . | |
| 4,799,695 | 1/1989 | Yoshino | 277/235 B X |
| 4,826,708 | 5/1989 | Udagawa . | |
| 4,834,399 | 5/1989 | Udagawa et al. | 277/235 B X |
| 4,898,396 | 2/1990 | Udagawa | 277/235 B |

FOREIGN PATENT DOCUMENTS

| | | |
|---|---|---|
| 55-53819 | 12/1980 | Japan . |
| 61-2285 | 1/1986 | Japan . |
| 61-35266 | 3/1986 | Japan . |

OTHER PUBLICATIONS

Cherry Steel Laminate Gasket Technical Report 1979 by: Ishikawa Gasket Co., Ltd.

Primary Examiner—Allan N. Shoap
Attorney, Agent, or Firm—Kanesaka and Takeuchi

[57] ABSTRACT

A steel laminate gasket of the invention is installed in an internal combustion engine having at least one cylinder hole and at least one through hole. The gasket comprises a first plate, a second plate situated under the first plate and a third plate situated between the first and second plates. A first sealing device is formed on at least one of the first and second plates to seal around the cylinder hole of the engine. Also, a second sealing device is formed on at least one of the first, second and third plates to seal around the through hole. The third plate includes sealing layers on both sides thereof, and a hole so that the first sealing device is located therein when the gasket is assembled. Leakage around the cylinder hole and through hole is effectively prevented.

7 Claims, 1 Drawing Sheet

STEEL LAMINATE GASKET

CROSS-REFERENCE TO RELATED APPLICATION

This is a continuation in part application of patent application Ser. No. 231,303 filed on Aug. 11, 1988 and U.S. Pat. No. 4,898,396 on Feb. 6, 1990.

BACKGROUND OF THE INVENTION AND RELATED ART STATEMENT

The present invention relates to a steel laminate gasket for an internal combustion engine to securely seal around cylinder holes and through holes.

An internal combustion engine is provided with a plurality of cylinder holes and other holes, such as holes for bolt, water, oil and push rod. When an engine is actuated, high pressure and high temperature are applied to the cylinder holes due to combustion of a fuel, while relatively low pressure and low temperature are applied to the other holes.

In order to properly seal between two engine blocks of an engine, a gasket is situated between the two engine blocks, such as a cylinder head and a cylinder block, and is tightened so that areas around the cylinder holes as well as the other holes are securely sealed. However, since the sealing conditions around the cylinder holes and other holes are different as explained above, it is not easy to securely seal around all the holes.

It has been known that beads are formed around the cylinder holes and other holes to securely seal around the holes. However, in case the beads are simply formed, sealing can not be perfectly made. Namely, while an engine is actuated, leakage may happen around the cylinder holes and other holes.

In some cases, seal rings may be separately attached around holes for water and oil. However, since the seal rings are separately prepared and installed in the gasket, it requires additional cost. Therefore, this method is not practical.

Accordingly, an object of the present invention is to provide a steel laminate gasket which can seal properly around all kinds of holes in an engine.

Another object of the present invention is to provide a steel laminate gasket as stated above, which can be manufactured easily and economically.

Further objects and advantages of the present invention will be apparent from the following description of the invention.

SUMMARY OF THE INVENTION

In accordance with the present invention, a steel laminate gasket is installed in an internal combustion engine having at least one cylinder hole and at least one through hole.

The gasket comprises a first plate, a second plate situated under the first plate and a third plate situated between the first and second plates. First sealing means is formed on at least one of the first and second plates to seal around the cylinder hole of the engine, and second sealing means is formed on at least one of the first, second and third plates to securely seal around the through hole.

The third plate includes at least one hole having a diameter larger than the diameter of the first sealing means so that the first sealing means is situated inside the hole when the gasket is assembled. Namely, the third plate does not extend to a position adjacent the cylinder hole.

Also, sealing layers are formed on both sides of the third plate. The sealing layers are made of soft materials to prevent fluid from passing between the plates. Since the third plate is not exposed to high temperature from the cylinder hole, the sealing layers may be made of soft materials which are not strong against heat but effective to fluid.

Preferably, one third plate is situated between the first and second plates. However, if necessary, two or more third plates may be installed between the first and second plates.

The first sealing means may comprise a bead, a curved portion and a flange situated above the bead, which are formed on the second plate adjacent the cylinder hole. The first plate may be provided with a bead situated adjacent the curved portion of the second plate.

The second sealing means may be a bead formed on the third plate around the through hole of the engine. Alternately, the first and second plates may be provided with beads around the through hole of the engine.

DETAILED DESCRIPTION OF PREFERRED EMBODIMENTS

Figure 1:
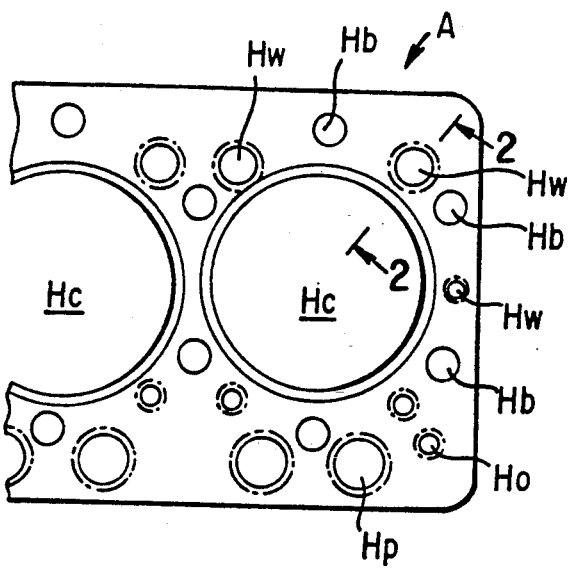
FIG. 1 is a partial plan view of a first embodiment of a steel laminate gasket of the present invention.
Figure 2:
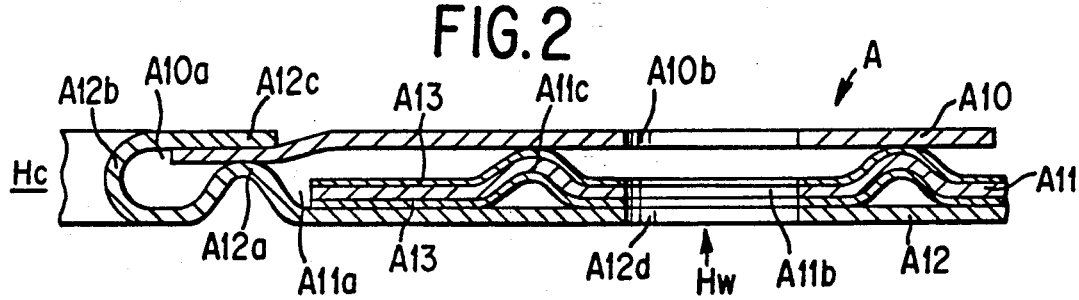
FIG. 2 is an enlarged section view taken along a line 2—2 in FIG. 1.

Referring to FIGS. 1 and 2, a first embodiment A of a steel laminate gasket of the invention is shown. The gasket A is provided with cylinder holes Hc, bolt holes Hb, water holes Hw, oil holes Ho and push rod holes Hp, as in the conventional gasket. The areas around the water holes Hw, oil holes Ho and push rod holes Hp are sealed in the same manner. For convenience, the cross section of the water hole Hw and cylinder hole Hc is shown in FIG. 2.

As shown in FIG. 2, the gasket A comprises an upper plate A10, a lower plate A12 and a middle plate A11 situated between the upper and lower plates A10, A12. The upper plate A10 is provided with a hole A10a for the cylinder hole Hc, and a hole A10b for the water hole Hw.

The lower plate A12 is provided with a bead A12a around the cylinder hole Hc, a curved portion A12b to define the cylinder hole Hc, and a flange A12c. The flange A12c is located above the bead A12a and a periphery of the hole A10a of the upper plate A10. Also, a hole A12d for the water hole Hw is formed in the lower plate A12.

The middle plate A11 is provided with a hole A11a and a hole A11b for the water hole Hw. The diameter of the hole A11a is larger than the diameter of the bead A12a. Therefore, when the gasket is assembled together, the bead A12a is located inside the hole A11a.

Also, the middle plate A11 is provided with a bead A11c around the hole A11b, and upper and lower coatings A13 covering the entire surfaces thereof. The bead A11c seals around the water hole Hw when the gasket is tightened. The coatings A13 are made of a soft material to provide resiliency. Gum, such as NBR gum, silicone gum and fluorine gum, is preferred. The thickness of the coating A13 is 5-100 micra, preferably 10-50 micra.

When the gasket is situated between two engine blocks (not shown) and is tightened, the bead A12a and curved portion A12b provide sealing pressure around the cylinder hole Hc, while the bead A11c provides sealing pressure around the water hole Hw. The gasket A can properly seal around the cylinder hole Hc and water hole Hw.

It is important in the present invention that the coating is made of a soft material, because the soft material seals properly between the plates to thereby prevent leakage of fluid from the water hole Hw. It is also important that the middle plate A11 does not extend to an area adjacent the cylinder hole Hc, because if the middle plate A11 extends to an area adjacent the cylinder hole Hc, the middle plate A11 is exposed to high temperature, which causes creep relaxation of the soft material formed on the middle plate A11. As a result, leakage may happen around the water hole Hw.

Namely, an effective coating material around the water hole Hw is weak against heat. Therefore, such a coating material can not be applied onto a plate for sealing around the cylinder hole Hc. Accordingly, a middle plate which does not extend to an area adjacent the cylinder hole Hc is used, and a coating material effective to fluid is applied onto the middle plate.

Generally, small scratches are formed on outer surfaces of an engine block when manufacturing the engine block. In order to fill up the small scratches, coating which are strong against heat may be formed on outer surfaces of the gasket. Therefore, in the present invention, thin coatings may be formed on the outer surfaces of the upper and lower plates A10, A12 which contact the engine blocks.

Figure 3:
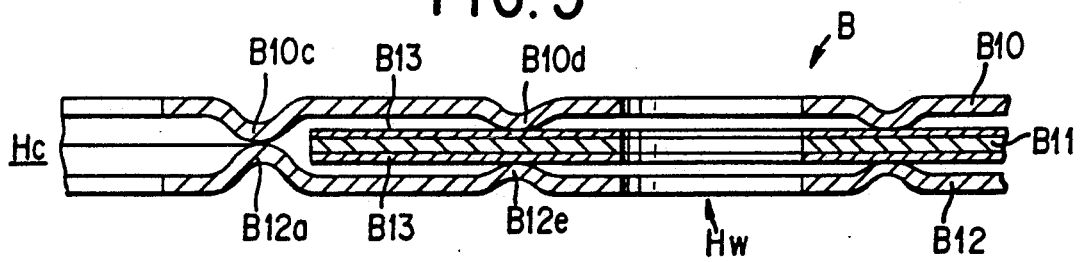
FIGS. 3 and 4 are enlarged section views, similar to FIG. 2, of second and third embodiments of a steel laminate gasket of the invention.

FIG. 3 shows a second embodiment B of a steel laminate gasket of the invention. The gasket B comprises an upper plate B10, a lower plate B12 and a middle plate B11 between the upper and lower plates B10, B12. The middle plate B11 includes coating B13 on outer surfaces thereof, which are the same as the coatings A13.

The upper plate B10 is provided with a bead B10c around the cylinder hole Hc and a beam B10d around the water hole Hw, while the lower plate B12 is provided with a bead B12a around the cylinder hole Hc and a bead B12e around the water hole Hw. When the gasket B is assembled, the beads B10c, B12a directly abut against each other, and the beads B10d, B12e face against each other with the middle plate B11 being interposed therebetween.

In the gasket B, the beads B10c, B12a seal around the cylinder hole Hc, and the beads B10d, B12e seal around the water hole Hw. The gasket B can provide strong sealing pressure around the cylinder hole Hc and water hole Hw.

Figure 4:
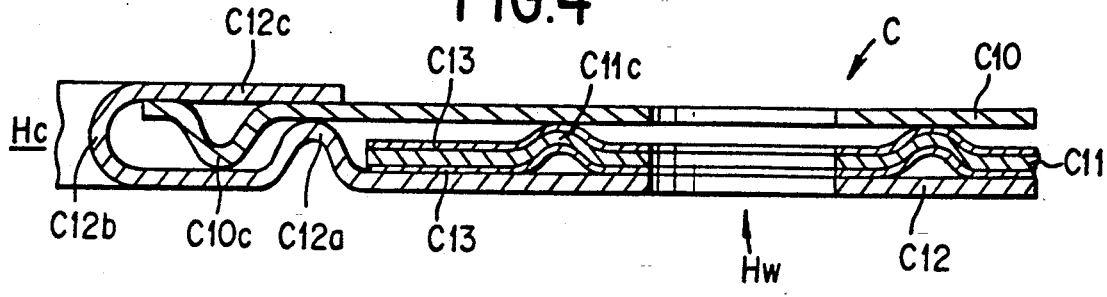

FIG. 4 shows a third embodiment C of a steel laminate gasket of the invention. The gasket C comprises an upper plate C10, a middle plate C11 with a bead C11c and coatings C13, and a lower plate C12 and a bead C12a, curved portion C12b and flange C12c, similar to the gasket A. However, in the gasket C, the upper plate C10 is further provided with a bead C10c extending toward the lower plate C12, which is located between the bead C12a and curved portion C12b.

In the gasket C, therefore, the area around the cylinder hole Hc is sealed by the beads C10c, C12a and the curved portion C12b. When the gasket C is tightened, wide and strong sealing pressure is obtained around the cylinder hole Hc. The other structure and advantages of the gasket C is the same as the gasket A.

In accordance with the present invention, the middle plate is not located in areas where high temperature is applied, and the coating material which is weak against heat but effective to seal around fluid holes is coated onto the middle plate. Therefore, areas around the fluid holes can be effectively sealed by even a single bead.

When the sealing pressure around the cylinder holes Hc is to be changed, the thickness of the middle plate may be changed, or the quality of the plate having a bead around the cylinder hole Hc may be changed as well. Also, when the sealing pressure around the fluid holes is to be changed, the thickness or quality of the plate having a bead for sealing around the fluid hole may be changed.

While the invention has been explained with reference to the specific embodiments of the invention, the explanation is illustrative and the invention is limited only by the appended claims.

What is claimed is:

1. A steel laminate gasket for an internal combustion engine having at least one cylinder hole and at least one through hole therein, comprising:

a first plate having at least one first hole corresponding to the cylinder hole of the engine, and at least one second hole corresponding to the through hole of the engine, a second plate situated under the first plate, said second plate having at least one third hole corresponding to the cylinder hole of the engine, and at least one fourth hole corresponding to the through pole of the engine, said second plate directly contacting the first plate adjacent the cylinder hole so that combusted gas in the cylinder hole does not enter between the first and second plates, first sealing means formed on at least one of the first and second plates, said first sealing means being situated adjacent to the cylinder hole of the engine to seal therearound, said first sealing means including a first bead formed on the second plate near the third hole to surround the same, a curved portion formed on the second plate to define the third hole and a flange formed on the second plate to extend from the curved portion in the direction away from the third hole, said flange being located above an edge portion of the first plate and the first bead, and at least one third plate situated between the first and second plates, said third plate including at lest one fifth hole having a size larger than a size of the first sealing means, said first sealing means, when the gasket is assembled, being situated inside the fifth hole so that the third plate is located at a predetermined distance away from the cylinder hole without directly exposing to the cylinder hole, at least one sixth hole corresponding to the through hole of the engine, and sealing layers formed on both entire side surfaces of the third plate, said sealing layers being made of soft materials to prevent fluid from flowing between the plates without causing creep relaxation due to heat from the cylinder hole.

2. A steel laminate gasket according to claim 1, wherein said first plate further includes a second bead near the first hole, said second bead being located between the first bead and the curved portion of the second plate and extending away from the flange.

3. A steel laminate gasket according to claim 1, further comprising second sealing means for sealing around the through hole of the engine, said second sealing means being formed on at least one of the first, second and third plates to securely seal around the through hole when the gasket is tightened.

4. A steel laminate gasket according to claim 3, wherein said second sealing means is a second bead formed on the third plate to surround the through hole of the engine.

5. A steel laminate gasket according to claim 3, wherein said second sealing means is a third bead formed on the first plate around the second hole, and a fourth bead formed on the second plate around the fourth hole, said third and fourth beads extending toward the third plate.

6. A steel laminate gasket for an internal combustion engine having at least one cylinder hole and at least one through hole therein, comprising:
   a first plate having at least one first hole corresponding to the cylinder hole of the engine, and at least one second hole corresponding to the through hole of the engine,
   a second plate situated under the first plate, said second plate having at least one third hole corresponding to the cylinder hole of the engine, and at least one fourth hole corresponding to the through hole of the engine,
   first sealing means formed on at least one of the first and second plates, said first sealing means being situated adjacent to the cylinder hole of the engine and directly contacting the other of the first and second plates around the cylinder hole so that the combusted gas in the cylinder does not enter between the first and second plates, said first sealing means including a first bead formed on the first plate around the first hole, and a second bead formed on the second plate around the third hole, said first and second beads facing and abutting against each other, and
   at least one third plate situated between the first and second plates, said third plate including at least one fifth hole having a size larger than a size of the first sealing means, said first sealing means, when the gasket is assembled, being situated inside the firth hole so that the third plate is located at a predetermined distance away from the cylinder hole without directly exposing the third plate to the cylinder hole, at least one sixth hole corresponding to the through hole of the engine, and sealing layers formed on both entire side surfaces of the third plate, said sealing layers being made of soft materials to prevent fluid from flowing between the plates without causing creep relaxation due to heat from the cylinder hole.

7. A steel laminate gasket according to claim 6, further comprising second sealing means for sealing around the through hole of the engine, said second sealing means being formed on at least one of the first, second and third plates to securely seal around the through hole when the gasket is tightened.

* * * * *